(12) United States Patent
Rothschild et al.

(10) Patent No.: US 7,818,238 B1
(45) Date of Patent: Oct. 19, 2010

(54) UPSIDE FORWARD WITH EARLY FUNDING PROVISION

(75) Inventors: James Rothschild, New York, NY (US); David B. Aidelson, Woodmere, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 765 days.

(21) Appl. No.: 11/246,542

(22) Filed: Oct. 11, 2005

(51) Int. Cl.
*G06Q 40/00* (2006.01)
(52) U.S. Cl. ...................... 705/36 R; 705/37
(58) Field of Classification Search ............. 705/35–45
See application file for complete search history.

(56) References Cited

U.S. PATENT DOCUMENTS

| | | |
|---|---|---|
| 4,169,285 A | 9/1979 | Walker |
| 4,648,038 A | 3/1987 | Roberts et al. |
| 4,739,478 A | 4/1988 | Roberts et al. |
| 4,742,457 A | 5/1988 | Leon et al. |
| 4,752,877 A | 6/1988 | Roberts et al. |
| 4,933,842 A | 6/1990 | Durbinet et al. |
| 5,121,469 A | 6/1992 | Richards et al. |
| 5,222,019 A | 6/1993 | Yoshino et al. |
| 5,257,369 A | 10/1993 | Skeen et al. |
| 5,270,922 A | 12/1993 | Higgins |
| 5,297,032 A | 3/1994 | Trojan et al. |
| 5,305,200 A | 4/1994 | Hartheimer et al. |
| 5,419,890 A | 5/1995 | Saidi |
| 5,454,104 A | 9/1995 | Steidlmayer et al. |
| 5,462,438 A | 10/1995 | Becker et al. |
| 5,497,317 A | 3/1996 | Hawkins et al. |
| 5,517,406 A | 5/1996 | Harris et al. |
| 5,557,798 A | 9/1996 | Skeen et al. |
| 5,563,783 A | 10/1996 | Stolfo et al. |
| 5,592,379 A | 1/1997 | Finfrock et al. |
| 5,649,186 A | 7/1997 | Ferguson |
| 5,675,746 A | 10/1997 | Marshall |
| 5,706,502 A | 1/1998 | Foley et al. |
| 5,710,889 A | 1/1998 | Clark et al. |

(Continued)

FOREIGN PATENT DOCUMENTS

WO    WO 98/43170    10/1998

(Continued)

OTHER PUBLICATIONS

Payout Policy, Capital Structure, and Compensation Contracts when Managers Value Control Author(s): Chun Chang Source: The Review of Financial Studies, vol. 6, No. 4 (Winter, 1993), pp. 911-933 Published by: Oxford University Press. Sponsor: The Society for Financial Studies.*

(Continued)

*Primary Examiner*—Hani Kazimi
*Assistant Examiner*—Abhishek Vyas
(74) *Attorney, Agent, or Firm*—Hunton & Williams LLP (57) ABSTRACT

A system for and method of providing a forward contract with an upside return and the possibility of early valuation are presented. The prices of the underlying financial instruments are allowed to float to a limited extent. Moreover, the party taking the short position is allowed to cash out early, without having to unwind the entire contract. The contact may be used, for example, by a corporation that wishes to raise capital using equity instruments.

5 Claims, 3 Drawing Sheets

U.S. PATENT DOCUMENTS

| | | | |
|---|---|---|---|
| 5,724,593 A | 3/1998 | Hargrave, III et al. |
| 5,778,157 A | 7/1998 | Oatman et al. |
| 5,783,808 A | 7/1998 | Josephson |
| 5,787,402 A | 7/1998 | Potter et al. |
| 5,806,047 A | 9/1998 | Hackel et al. |
| 5,806,048 A | 9/1998 | Kiron et al. |
| 5,819,273 A | 10/1998 | Vora et al. |
| 5,832,461 A | 11/1998 | Leon et al. |
| 5,845,266 A | 12/1998 | Lupien et al. |
| 5,864,827 A | 1/1999 | Wilson |
| 5,890,140 A | 3/1999 | Clark et al. |
| 5,913,214 A | 6/1999 | Madnick et al. |
| 5,918,218 A | 6/1999 | Harris et al. |
| 5,922,044 A | 7/1999 | Banthia |
| 5,940,810 A | 8/1999 | Traub et al. |
| 5,944,784 A | 8/1999 | Simonoff et al. |
| 5,946,667 A | 8/1999 | Tull, Jr. et al. |
| 5,950,176 A | 9/1999 | Keiser et al. |
| 5,966,531 A | 10/1999 | Skeen et al. |
| 5,966,672 A | 10/1999 | Knupp |
| 5,966,700 A | 10/1999 | Gould et al. |
| 5,970,479 A | 10/1999 | Shepherd |
| 5,986,673 A | 11/1999 | Martz |
| 5,995,943 A | 11/1999 | Bull et al. |
| 6,006,206 A | 12/1999 | Smith et al. |
| 6,012,046 A | 1/2000 | Lupien et al. |
| 6,018,714 A | 1/2000 | Risen, Jr. |
| 6,018,721 A | 1/2000 | Aziz et al. |
| 6,023,280 A | 2/2000 | Becker et al. |
| 6,029,146 A | 2/2000 | Hawkins et al. |
| 6,029,147 A | 2/2000 | Horadan et al. |
| 6,035,287 A | 3/2000 | Stallaert et al. |
| 6,049,783 A | 4/2000 | Segal et al. |
| 6,052,673 A | 4/2000 | Leon et al. |
| 6,055,522 A | 4/2000 | Krishna et al. |
| 6,058,378 A | 5/2000 | Clark et al. |
| 6,061,662 A | 5/2000 | Makivic |
| 6,064,984 A | 5/2000 | Ferguson et al. |
| 6,073,104 A | 6/2000 | Field |
| 6,073,109 A | 6/2000 | Flores et al. |
| 6,073,115 A | 6/2000 | Marshall |
| 6,078,903 A | 6/2000 | Kealhofer |
| 6,078,914 A | 6/2000 | Redfern |
| 6,078,956 A | 6/2000 | Bryant et al. |
| 6,081,774 A | 6/2000 | de Hita et al. |
| 6,088,685 A | 7/2000 | Kiron et al. |
| 6,092,056 A | 7/2000 | Tull, Jr. et al. |
| 6,105,005 A | 8/2000 | Fuhrer |
| 6,131,082 A | 10/2000 | Hargrave, III et al. |
| 6,134,600 A | 10/2000 | Liu |
| 6,148,298 A | 11/2000 | LaStrange et al. |
| 6,173,270 B1 | 1/2001 | Cristofich et al. |
| 6,173,276 B1 | 1/2001 | Kant et al. |
| 6,178,420 B1 | 1/2001 | Sassano |
| 6,185,567 B1 | 2/2001 | Ratnaraj et al. |
| 6,195,647 B1 | 2/2001 | Martyn et al. |
| 6,226,623 B1 | 5/2001 | Schein et al. |
| 6,233,566 B1 | 5/2001 | Levine et al. |
| 6,236,972 B1 | 5/2001 | Shkedy |
| 6,236,977 B1 | 5/2001 | Verba et al. |
| 6,243,670 B1 | 6/2001 | Bessho et al. |
| 6,260,021 B1 | 7/2001 | Wong et al. |
| 6,263,321 B1 | 7/2001 | Daughtery, III |
| 6,263,335 B1 | 7/2001 | Paik et al. |
| 6,266,683 B1 | 7/2001 | Yehuda et al. |
| 6,272,474 B1 | 8/2001 | Garcia |
| 6,275,229 B1 | 8/2001 | Weiner et al. |
| 6,278,982 B1 | 8/2001 | Korhammer et al. |
| 6,282,537 B1 | 8/2001 | Madnick et al. |
| 6,285,986 B1 | 9/2001 | Andrews |
| 6,285,989 B1 | 9/2001 | Shoham |
| 6,304,858 B1 | 10/2001 | Mosler et al. |
| 6,313,854 B1 | 11/2001 | Gibson |
| 6,317,726 B1 | 11/2001 | O'Shaughnessy |
| 6,317,728 B1 | 11/2001 | Kane |
| 6,321,212 B1 | 11/2001 | Lange |
| 6,323,881 B1 | 11/2001 | Broulik et al. |
| 6,332,163 B1 | 12/2001 | Bowman-Amuah |
| 6,338,055 B1 | 1/2002 | Hagmann et al. |
| 6,338,068 B1 | 1/2002 | Moore et al. |
| 6,343,287 B1 | 1/2002 | Kumar et al. |
| 6,347,307 B1 | 2/2002 | Sandhu et al. |
| 6,349,291 B1 | 2/2002 | Varma |
| 6,356,933 B2 | 3/2002 | Mitchell et al. |
| 6,360,210 B1 | 3/2002 | Wallman |
| 6,366,908 B1 | 4/2002 | Chong et al. |
| 6,381,585 B1 | 4/2002 | Maples et al. |
| 6,381,586 B1 | 4/2002 | Glasserman et al. |
| 6,385,660 B2 | 5/2002 | Griesemer et al. |
| 6,389,413 B2 | 5/2002 | Takahashi et al. |
| 6,389,452 B1 | 5/2002 | Glass |
| 6,401,080 B1 | 6/2002 | Bigus et al. |
| 6,408,282 B1 | 6/2002 | Buist |
| 6,418,417 B1 | 7/2002 | Corby et al. |
| 6,421,653 B1 | 7/2002 | May |
| 6,424,980 B1 | 7/2002 | Iizuka et al. |
| 6,429,868 B1 | 8/2002 | Dehner, Jr. et al. |
| 6,442,545 B1 | 8/2002 | Feldman et al. |
| 6,446,047 B1 * | 9/2002 | Brier et al. ............... 705/35 |
| 6,446,110 B1 | 9/2002 | Lection et al. |
| 6,457,066 B1 | 9/2002 | Mein et al. |
| 6,460,021 B1 | 10/2002 | Kirksey |
| 6,480,882 B1 | 11/2002 | McAdam et al. |
| 6,489,954 B1 | 12/2002 | Powlette |
| 6,490,584 B2 | 12/2002 | Barrett et al. |
| 6,493,681 B1 | 12/2002 | Tertitski et al. |
| 6,510,406 B1 | 1/2003 | Marchisio |
| 6,516,303 B1 | 2/2003 | Wallman |
| 6,516,308 B1 | 2/2003 | Cohen |
| 6,523,022 B1 | 2/2003 | Hobbs |
| 6,556,987 B1 | 4/2003 | Brown et al. |
| 6,564,250 B1 | 5/2003 | Nguyen |
| 6,581,056 B1 | 6/2003 | Rao |
| 6,581,062 B1 | 6/2003 | Draper et al. |
| 6,598,028 B1 | 7/2003 | Sullivan et al. |
| 6,601,044 B1 | 7/2003 | Wallman |
| 6,611,825 B1 | 8/2003 | Billheimer et al. |
| 6,615,187 B1 | 9/2003 | Ashenmil et al. |
| 6,629,097 B1 | 9/2003 | Keith |
| 6,631,373 B1 | 10/2003 | Otani et al. |
| 6,633,868 B1 | 10/2003 | Min et al. |
| 6,711,554 B1 | 3/2004 | Salzmann et al. |
| 7,191,392 B1 | 3/2007 | Coar |
| 7,222,094 B2 * | 5/2007 | Ross ................ 705/36 R |
| 7,392,210 B1 | 6/2008 | MacKay et al. |
| 7,392,212 B2 | 6/2008 | Hancock et al. |
| 2001/0011241 A1 | 8/2001 | Nemzow |
| 2001/0011242 A1 | 8/2001 | Allex et al. |
| 2001/0018674 A1 | 8/2001 | Schein et al. |
| 2001/0025264 A1 | 9/2001 | Deaddio et al. |
| 2001/0032217 A1 | 10/2001 | Huang |
| 2001/0042034 A1 | 11/2001 | Elliott |
| 2001/0043235 A1 | 11/2001 | Best et al. |
| 2001/0044771 A1 | 11/2001 | Usher et al. |
| 2001/0056398 A1 | 12/2001 | Scheirer |
| 2002/0002530 A1 | 1/2002 | May |
| 2002/0004777 A1 | 1/2002 | Foster et al. |
| 2002/0007335 A1 | 1/2002 | Millard et al. |
| 2002/0007358 A1 | 1/2002 | Johnson et al. |
| 2002/0013753 A1 | 1/2002 | Marks de Chabris et al. |
| 2002/0013862 A1 | 1/2002 | Orchard et al. |
| 2002/0016762 A1 | 2/2002 | Feilbogen et al. |
| 2002/0016819 A1 | 2/2002 | Sugimoto et al. |
| 2002/0018077 A1 | 2/2002 | Powlette |

| | | | |
|---|---|---|---|
| 2002/0022956 A1 | 2/2002 | Ukranincsky et al. | |
| 2002/0023053 A1 | 2/2002 | Szoc et al. | |
| 2002/0026405 A1 | 2/2002 | Haar | |
| 2002/0026449 A1 | 2/2002 | Azencott | |
| 2002/0026462 A1 | 2/2002 | Shotton, Jr. et al. | |
| 2002/0029183 A1 | 3/2002 | Vlahoplus et al. | |
| 2002/0032644 A1 | 3/2002 | Corby et al. | |
| 2002/0035561 A1 | 3/2002 | Archer et al. | |
| 2002/0042767 A1 | 4/2002 | Kwan | |
| 2002/0049665 A1* | 4/2002 | Solomon et al. | 705/37 |
| 2002/0049666 A1 | 4/2002 | Reuter et al. | |
| 2002/0054115 A1 | 5/2002 | Mack et al. | |
| 2002/0059141 A1 | 5/2002 | Davies et al. | |
| 2002/0065752 A1 | 5/2002 | Lewis | |
| 2002/0065755 A1 | 5/2002 | Shlafman et al. | |
| 2002/0069157 A1 | 6/2002 | Jordan | |
| 2002/0073007 A1 | 6/2002 | Ayache | |
| 2002/0078253 A1 | 6/2002 | Szondy et al. | |
| 2002/0087373 A1 | 7/2002 | Dickstein et al. | |
| 2002/0087454 A1 | 7/2002 | Calo et al. | |
| 2002/0087455 A1 | 7/2002 | Tsagarakis et al. | |
| 2002/0087457 A1 | 7/2002 | Madeley et al. | |
| 2002/0099646 A1 | 7/2002 | Agarwal et al. | |
| 2002/0099656 A1 | 7/2002 | Poh Wong | |
| 2002/0112056 A1 | 8/2002 | Baldwin et al. | |
| 2002/0123947 A1 | 9/2002 | Yuste et al. | |
| 2002/0130868 A1 | 9/2002 | Smith | |
| 2002/0138390 A1 | 9/2002 | May | |
| 2002/0147671 A1 | 10/2002 | Sloan et al. | |
| 2002/0152154 A1 | 10/2002 | Rothman et al. | |
| 2002/0152156 A1 | 10/2002 | Tyson-Quah | |
| 2002/0156658 A1 | 10/2002 | Selesny et al. | |
| 2002/0161692 A1 | 10/2002 | Loh et al. | |
| 2002/0161853 A1 | 10/2002 | Burak et al. | |
| 2002/0169707 A1 | 11/2002 | Koek et al. | |
| 2002/0174043 A1 | 11/2002 | Gilbert et al. | |
| 2002/0178096 A1 | 11/2002 | Marshall | |
| 2002/0184132 A1 | 12/2002 | Foster | |
| 2002/0184237 A1 | 12/2002 | McFeely | |
| 2002/0194097 A1 | 12/2002 | Reitz | |
| 2002/0194114 A1 | 12/2002 | Erdmier | |
| 2003/0004942 A1 | 1/2003 | Bird | |
| 2003/0009411 A1 | 1/2003 | Ram et al. | |
| 2003/0018558 A1 | 1/2003 | Heffner et al. | |
| 2003/0018714 A1 | 1/2003 | Mikhailov et al. | |
| 2003/0033212 A1 | 2/2003 | Sandhu et al. | |
| 2003/0037174 A1 | 2/2003 | Lavin et al. | |
| 2003/0065594 A1 | 4/2003 | Murphy | |
| 2003/0066025 A1 | 4/2003 | Garner et al. | |
| 2003/0066032 A1 | 4/2003 | Ramachandran et al. | |
| 2003/0078869 A1 | 4/2003 | Williams | |
| 2003/0088496 A1 | 5/2003 | Piotrowski | |
| 2003/0093360 A1 | 5/2003 | May | |
| 2003/0093362 A1 | 5/2003 | Tupper et al. | |
| 2003/0093565 A1 | 5/2003 | Berger et al. | |
| 2003/0105981 A1 | 6/2003 | Miller et al. | |
| 2003/0115122 A1 | 6/2003 | Slater et al. | |
| 2003/0126063 A1 | 7/2003 | Reuter | |
| 2003/0126068 A1 | 7/2003 | Hauk et al. | |
| 2003/0126069 A1 | 7/2003 | Cha | |
| 2003/0126117 A1 | 7/2003 | Megiddo et al. | |
| 2003/0140035 A1 | 7/2003 | Burrows | |
| 2003/0149653 A1 | 8/2003 | Penney | |
| 2003/0154071 A1 | 8/2003 | Shreve | |
| 2003/0158949 A1 | 8/2003 | Miller et al. | |
| 2003/0163400 A1* | 8/2003 | Ross et al. | 705/35 |
| 2003/0163401 A1* | 8/2003 | Dines et al. | 705/35 |
| 2003/0188255 A1 | 10/2003 | Shimizu et al. | |
| 2003/0220861 A1 | 11/2003 | Broms et al. | |
| 2003/0220868 A1 | 11/2003 | May | |
| 2003/0233459 A1 | 12/2003 | Miller et al. | |
| 2003/0236862 A1 | 12/2003 | Miller et al. | |
| 2003/0236957 A1 | 12/2003 | Miller et al. | |
| 2004/0039666 A1 | 2/2004 | Fudali et al. | |
| 2004/0064397 A1 | 4/2004 | Lynn et al. | |
| 2004/0078248 A1 | 4/2004 | Altschuler | |
| 2004/0103003 A1 | 5/2004 | Mayers et al. | |
| 2004/0148247 A1 | 7/2004 | Miller et al. | |
| 2004/0162775 A1 | 8/2004 | Winklevoss et al. | |
| 2004/0167850 A1 | 8/2004 | Dreyer et al. | |
| 2004/0215553 A1 | 10/2004 | Gang et al. | |
| 2004/0220885 A1 | 11/2004 | Salzmann et al. | |
| 2004/0225596 A1 | 11/2004 | Kemper et al. | |
| 2004/0236671 A1* | 11/2004 | Woodruff et al. | 705/37 |
| 2005/0060256 A1 | 3/2005 | Peterson et al. | |
| 2005/0086148 A1* | 4/2005 | Woodruff et al. | 705/36 |
| 2005/0086170 A1 | 4/2005 | Rao | |
| 2005/0102213 A1* | 5/2005 | Savasoglu et al. | 705/36 |
| 2005/0102214 A1 | 5/2005 | Speth et al. | |
| 2005/0160025 A1* | 7/2005 | Birle et al. | 705/37 |
| 2007/0043654 A1 | 2/2007 | Libman | |

FOREIGN PATENT DOCUMENTS

| | | |
|---|---|---|
| WO | WO 01/20530 | 3/2001 |
| WO | WO 01/37540 | 5/2001 |
| WO | WO 01/57716 | 8/2001 |
| WO | WO 01/59670 | 8/2001 |
| WO | WO 02/03774 | 1/2002 |
| WO | WO 02/14991 | 2/2002 |
| WO | WO 02/054189 | 7/2002 |
| WO | WO 02/056146 | 7/2002 |
| WO | WO 02/063516 | 8/2002 |
| WO | WO 02/065278 | 8/2002 |
| WO | WO 02/065286 | 8/2002 |
| WO | WO 03/012588 | 2/2003 |
| WO | WO 03/030013 | 4/2003 |
| WO | WO 03/032158 | 4/2003 |
| WO | WO 03/065256 | 8/2003 |
| WO | WO 03/102733 | 12/2003 |

OTHER PUBLICATIONS

Jon D. Markman. (Feb. 11, 1997). Wall Street, California; How About a Convertible Preferred?; Hybrid Can Offer a Stock's Growth but With Less Risk :Home Edition. Los Angeles Times,p. D, 5:1. Retrieved May 21, 2010, from Los Angeles Times. (Document ID: 11038513).*

Manco et al., A Framework for Adaptive Mail Classification, 14th IEEE Conference on Tools with Artificial Intelligence (ICTAI'02), Nov. 4, 2002, p. 387.

Silverman, A new strategy for giving away your money, Wall Street Journal, D1, Oct. 6, 2004.

Czejdo, Automatic generation ontology based anntations in XML and their use in retrieval systems, Web Information Systems Engineering, 2000, Proceedings of the First International Conference, Jun. 19, 2000, p. 296.

Block Trades Market Practice, Apr. 1, 2003, pp. 1-10.

Martin, Email Report, Issue 11, Aug. 16, 2001, printed Aug. 2, 2005.

Form 10-K, United States Securities and Exchange Commission, no date,year ending Dec. 31, 2003.

PILA, In Case Of Emergency; contingent capital.

Intellseek and Inxight Partner to Provide New Business Intelligence Solutions, www.inxight.com/news/021029_intelliseek.html, Oct. 29, 2002.

May, Modeling and Querying Structure and Contents of the Web, 10th International Workshop on Database & Expert Systems Applications, Sep. 1, 1999, p. 721.

Rising to the challenge of global STP, Euromoney Publications PLC Global Inventor, Nov. 1, 1999, pp. 51-52; Issn. 0951-3604.

STP in the Bond Market?, Wall Street & Technology, Dec. 1, 2002, p. 20.

Fan et al., The Internet and Future Financial Markets; Industry Trend or Event, Association for Computing Machinery, Inc., Sec. 11, vol. 43; Nov. 1, 2000, p. 82; Issn: 0001-0782.

Emery, et al., The Measurement of Liquidity, Journal of Accounting Research, vol. 20, No. 2, Part 1, p. 290-303, Autumn 1982.

TradeWeb's STP vision, Euromoney Institutional Investor PLC, Sec. 406, vol. 34, Feb. 1, 2003, p. S6; Issn: 0014-2433.
Novell, Inc., Beginning of Viewing Information and Viewing Basic Information about a print job; Jun. 1, 1993.
Chacko, Cephalon, Inc. Taking Risk Management Gherory Seriously; May 1, 2001.
Kus, Contingent capital: just in the capital management sets a new standard; Sponsored statement; Oct. 1, 2002.
Electronic Trading Tools; before Aug. 29, 1993.
Fast Email Extractor 4.4; Sep. 2, 2003.
Freddie Mac's document custody procedure overview—2003; Dec. 2003.
Unknown, Investigating Systems; www.investing-systems.com; Oct. 21, 2002.
Rupali et al., Phrase-based Text Representation for Managing the Web Documents; Apr. 28, 2003.
Lam et al., Querying Web Data—The WebQA Approach; Dec. 12, 2002.
Ericson, Softwerc releases patent-pending; Nov. 15, 2002.
IBM Corp., Strict Read Order Control for a Queing System; Mar. 1, 2002.
Carchiolo et al., Structuring the Web; Sep. 6, 2000.
Witten et al., Text Mining: A New Frontier for Lossless Compression; Mar. 29, 1999.
Calado, The Web-DL Environment for Building Digital Libraries from the Web; May 27, 2003.
Ribiero-Neto et al., Top Down Extraction of Semi-Structured Data, String Processing and Information Retrieval Symposium & amp; Sep. 21, 1999.
Roberts, Top Priority on Bottom Line: More Companies Seeting to Manage Business Risks; Mar. 20, 2000.
Elkayam, Using Indexed Bonds; Apr. 11, 2002.
Myllymaki, With Standard XML Technologies; May 2, 2001.
Hewlett-Packard, x4queview.org; Mar. 2, 1992.

* cited by examiner

UPSIDE FORWARD WITH EARLY FUNDING PROVISION

FIELD OF THE INVENTION

The present invention generally relates to a system for and method of securing capital. More particularly, the invention relates to a derivative financial instrument that can provide value prior to maturation.

DESCRIPTION OF RELATED ART

Financial instruments generally designed to provide funding to entities are known. In particular, an entity may raise capital by issuing debt instruments, such as corporate bonds, or by issuing equity instruments, such as stocks. More exotic financial instruments, such as financial derivatives, also exist.

A "plain vanilla" forward contract is one type of financial derivative. With such a forward, a first party agrees to purchase a quantity of financial instruments from a second party on some future date. The forward generally specifies both the date on which the purchase must occur and an agreed-upon price of the financial instruments. Forwards are generally custom-drafted instruments between two parties.

A second type of financial instrument is a range forward. A range forward is similar to a plain vanilla forward, except that the prices of the financial instruments at the conclusion of the contract are allowed to float to a limited extent. Thus, for example, a party may contract to sell a quantity of stock at a date in the future, where the selling price is partially dependent on the market price of the stock on that date.

Range forwards lack a mechanism for the selling party to extract value from the transaction prior to the contract maturity date without unwinding (and therefore canceling) the entire contract. In existing products, a party that wishes to receive value prior to the contract conclusion date must unwind the contract (e.g., cancel the contract and disengage from the associated trades), and rely on the other party's determination of fair market value to construct a separate transaction. In determining a fair market value, the other party will generally base its assessment on parameters such as interest rates, borrow costs, dividends, and volatility that may include subjective components. Thus, the valuation could vary materially depending on the party conducting the analysis. Moreover, as the other party is not contractually bound to unwind the contract prior to maturity, the party that wishes to receive value will be in no position to demand a better price. Thus, a party holding the short position in a range forward is limited to subjective, financially inefficient, and potentially expensive techniques for obtaining value prior to the contract's conclusion. In short, current products lack the ability to provide a party with value during the contract term without unwinding the transaction and relying on a fair market value calculation.

SUMMARY OF THE INVENTION

The present invention has many advantages over the prior art. For example, certain embodiments of the present invention allow entities to raise capital using a financial derivative that allows extraction of value prior to the contract maturity date. Entities taking the short position in such contracts, e.g., issuers of the underlying financial instruments, may extract value prior to the contract's conclusion. This provides for highly flexible funding timing, as a party taking the short position in a contract according to such embodiments may obtain value at any time prior to the contract's expiration. Such embodiments do not require unwinding the contract and subjecting it to a fair market value calculation and negotiation in order to extract value prior to the maturity date.

According to certain embodiments of the invention, entities may raise capital on a flexible schedule while limiting loss should the underlying financial instruments experience a drop in market value. Thus, such entities may benefit, to a limited extent, from market gains in the underlying financial instruments to obtain an upside without the risk of a sizable downside. Such entities benefit from any upside less than a ceiling price, while a floor price protects issuers from adverse market turns.

Embodiments of the present invention may be used to obtain funds using a company's own stock as the underlying financial instruments. Such embodiments provide for favorable accounting treatment of the capital raised while avoiding stock dilution. That issuers may benefit from an expected upside creates a perception in the market of issuer optimism. Thus, certain embodiments of the present invention may be used by an issuer to raise capital while simultaneously projecting a bullish market message regarding its stock.

According to an embodiment of the present invention, a method of obtaining funding is disclosed. The method includes contracting for sale of a first quantity of financial instruments on a maturity date in exchange for a price, where the price and/or the first quantity are at least partially dependant on a market price of the first quantity of financial instruments at a delivery date, the delivery being to an entity. The method also includes delivering, in accordance with the step of contracting, a second quantity of the financial instruments at a time prior to the maturity date to the entity. The method also includes receiving value for the second quantity of financial instruments from the entity, the step of receiving value being in accordance with the step of contracting. The method also includes calculating a maturity balance using a computer, where the step of calculating comprises accounting for the first quantity of financial instruments and accounting for the second quantity of financial instruments.

Various optional features of the above embodiment include the following. The price may comprise a predetermined ceiling price if a market price of the quantity of financial instruments at the maturity date is greater than the ceiling price, a predetermined floor price if the market price of the quantity of financial instruments at the maturity date is less than the floor price, and a market price of the quantity of financial instruments at the maturity date if the market price of the quantity of financial instruments at the maturity date lies between the ceiling price and the floor price. The ceiling price and the floor price may be determined at the step of contracting. The method may include issuing the financial instruments. The value may comprises a present value of a floor price of the second quantity of financial instruments. The second quantity may less than the first quantity. Compensation may be received, the compensation comprising a difference between a ceiling price and a floor price for the second quantity of financial instruments if a market price of the second quantity of financial instruments at the delivery date is greater than the ceiling price, zero if the market price of the second quantity of financial instruments at the delivery date is less than the floor price, and a difference between the market price of the second quantity of financial instruments at the delivery date and the floor price for the second quantity of financial instruments if the market price of the second quantity of financial instruments at the delivery date lies between the ceiling price and the floor price for the second quantity of financial instruments.

According to an embodiment of the present invention, a method of providing funding is disclosed. The method includes contracting with an entity to purchase a first quantity of financial instruments on at least one predetermined future date for a price, the price and/or first quantity being at least partially dependant on a market price of the first quantity of financial instruments at a delivery date. The method also includes hedging a position, using a computer, the position defined at least partially by the contracting step. The method also includes buying, in accordance with the contracting step, a second quantity of the financial instruments from the entity at a time prior to the predetermined future date.

Various optional features of the above embodiment include the following. The step of hedging may include dynamic hedging. The price may comprise a predetermined ceiling price if a market price of the quantity of financial instruments at the maturity date is greater than the ceiling price, a predetermined floor price if the market price of the quantity of financial instruments at the maturity date is less than the floor price, and a market price of the quantity of financial instruments at the maturity date if the market price of the quantity of financial instruments at the maturity date lies between the ceiling price and the floor price. The ceiling price and the floor price may be determined at the step of contracting. The entity may issue the financial instruments. The step of buying may include buying for a present value of a floor price of the second quantity of financial instruments. The second quantity may be less than the first quantity. The compensation may comprise a difference between a ceiling price and a floor price for the second quantity of financial instruments if a market price of the second quantity of financial instruments at the maturity date is greater than the ceiling price, zero if the market price of the second quantity of financial instruments at the maturity date is less than the floor price, and a difference between the market price of the second quantity of financial instruments at the maturity date and the floor price for the second quantity of financial instruments if the market price of the second quantity of financial instruments at the maturity date lies between the ceiling price and the floor price for the second quantity of financial instruments.

According to an embodiment of the present invention, a method of obtaining funding is disclosed. The method includes contracting for sale of a first quantity of financial instruments on a maturity date in exchange for a price, where the price and/or the first quantity are at least partially dependant on a market price of the first quantity of financial instruments at a delivery date, the delivery being to an entity. The method also includes offering to the entity, in accordance with the step of contracting, a second quantity of the financial instruments at a time prior to the maturity date. The method also includes calculating, using a computer, a maturity balance, the step of calculating comprising accounting for the first quantity of financial instruments and accounting for the second quantity of financial instruments.

Various optional features of the above embodiment include the following. The price may comprise a predetermined ceiling price if a market price of the quantity of financial instruments at the maturity date is greater than the ceiling price, a predetermined floor price if the market price of the quantity of financial instruments at the maturity date is less than the floor price, and a market price of the quantity of financial instruments at the maturity date if the market price of the quantity of financial instruments at the maturity date lies between the ceiling price and the floor price. The ceiling price and the floor price may be determined at the step of contracting. The method may include issuing the financial instruments. The method may include receiving an acceptance of an offer, the offer arising from the step of offering, delivering, in accordance with the step of contracting and in accordance with the step of offering, the second quantity of the financial instruments at a time prior to the maturity date to the entity, and receiving value for the second quantity of financial instruments from the entity, the step of receiving value being in accordance with the step of contracting. The value may include a present value of a floor price of the second quantity of financial instruments. The second quantity may be less than the first quantity. The method may include paying compensation, the compensation comprising a difference between a ceiling price and a floor price for the second quantity of financial instruments if a market price of the second quantity of financial instruments at the maturity date is greater than the ceiling price, zero if the market price of the second quantity of financial instruments at the maturity date is less than the floor price, and a difference between the market price of the second quantity of financial instruments at the maturity date and the floor price for the second quantity of financial instruments if the market price of the second quantity of financial instruments at the maturity date lies between the ceiling price and the floor price for the second quantity of financial instruments.

According to an embodiment of the present invention, a method of providing funding is provided. The method includes contracting with an entity to purchase a first quantity of financial instruments on a predetermined future date for a price, the price and/or first quantity being at least partially dependant on a market price of the first quantity of financial instruments at a delivery date. The method also includes hedging a position, using a computer, the position defined at least partially by the contracting step. The method also includes receiving an offer to buy, in accordance with the contracting step, a second quantity of the financial instruments from the entity at a time prior to the predetermined future date.

Various optional features of the above embodiment include the following. The step of hedging may include dynamic hedging. The price may comprise a predetermined ceiling price if a market price of the quantity of financial instruments at the maturity date is greater than the ceiling price, a predetermined floor price if the market price of the quantity of financial instruments at the maturity date is less than the floor price, and a market price of the quantity of financial instruments at the maturity date if the market price of the quantity of financial instruments at the maturity date lies between the ceiling price and the floor price. The ceiling price and the floor price may be determined at the step of contracting. The entity may issue the financial instruments. The method may include accepting the offer to buy, receiving, in accordance with the step of contracting and in accordance with the step of offering, the second quantity of the financial instruments at a time prior to the maturity date to the entity, and delivering value for the second quantity of financial instruments to the entity, the step of delivering value being in accordance with the step of contracting. The step of delivering value may include delivering a present value of a floor price of the second quantity of financial instruments. The second quantity may be less than the first quantity. The method may further include paying compensation, the compensation comprising a difference between a ceiling price and a floor price for the second quantity of financial instruments if a market price of the second quantity of financial instruments at the maturity date is greater than the ceiling price, zero if the market price of the second quantity of financial instruments at the maturity date is less than the floor price, and a difference between the market price of the second quantity of financial instruments at the maturity date and the floor price for the second quantity of financial instruments if the market price of the second quantity of financial instruments at the maturity date lies between the ceiling price and the floor price for the second quantity of financial instruments.

According to an embodiment of the present invention, a system of providing funding is disclosed. The system includes means for contracting with an entity to purchase a first quantity of financial instruments on a predetermined future date for a price, the price and/or first quantity being at least partially dependant on a market price of the first quantity of financial instruments at a delivery date. The system also includes means for hedging a position, using a computer, the position defined at least partially by the contracting step. The system also includes means for buying, in accordance with the contracting step, a second quantity of the financial instruments from the entity at a time prior to the predetermined future date.

According to an embodiment of the present invention, a method for providing funding is disclosed. The method includes contracting with a company for purchase of a first quantity of the company's stock on a maturity date in exchange for a maturity price, where the maturity price comprises a predetermined ceiling price if a market price of the quantity of stock at the maturity date is greater than the ceiling price, a predetermined floor price if the market price of the quantity of stock at the maturity date is less than the floor price, and a market price of the quantity of stock at the maturity date if the market price of the quantity of stock at the maturity date lies between the ceiling price and the floor price. The method also includes hedging a position, using a computer, the position defined at least partially by the contracting step. The method also includes accepting an offer to purchase from the company, in accordance with the step of contracting, a second quantity of the stock at a time prior to the maturity date. The method also includes receiving the second quantity of stock from the company, the step of receiving being in accordance with the step of contracting. The method also includes delivering to the company, in accordance with the step of contracting, payment for the second quantity of stock at a time prior to the maturity date.

BRIEF DESCRIPTION OF THE DRAWINGS

The invention, both as to its structure and operation together with the additional objects and advantages thereof are best understood through the following description of exemplary embodiments of the present invention when read in conjunction with the accompanying drawings.

DETAILED DESCRIPTION OF THE PREFERRED EMBODIMENTS

Figure 1:
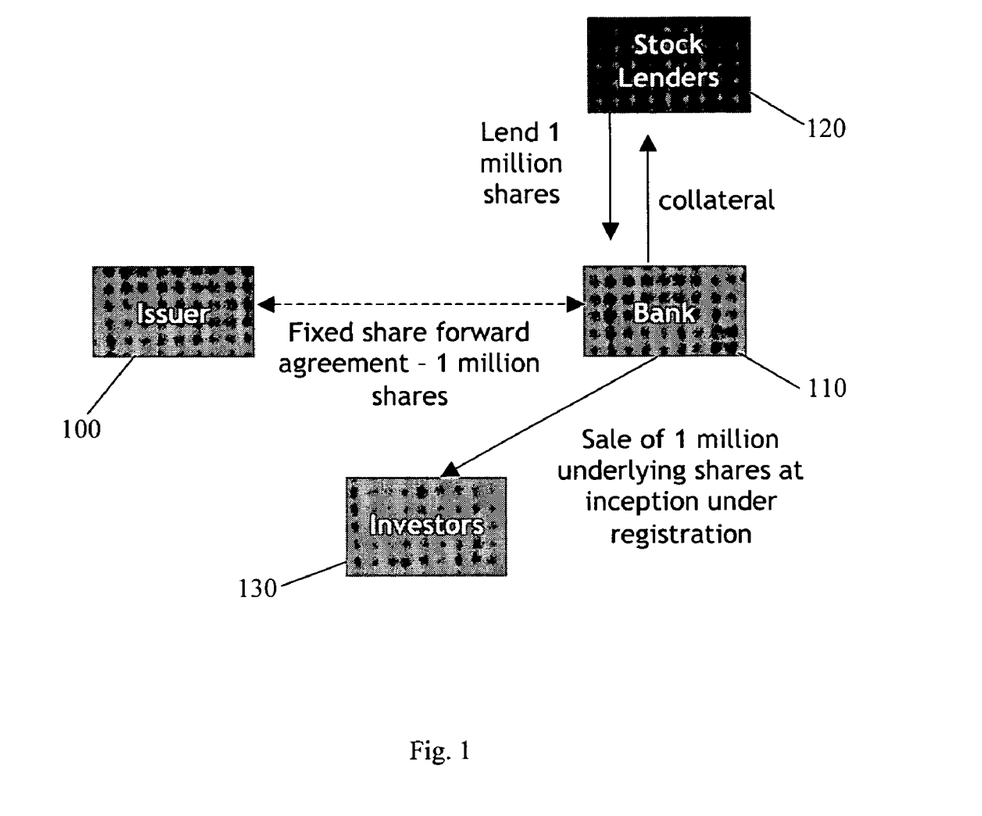
FIG. 1 is a schematic diagram illustrating an embodiment of the present invention at inception.

FIG. 1 is a schematic diagram illustrating an embodiment of the present invention. Issuer 100 enters into a contract with a bank ("Bank") 110 to deliver a quantity of its shares at a future date. (The terms "Issuer" and "Bank" are used by way of non-limiting example; the entities identified by these terms need not issue financial instruments or be a bank.) Issuer thus locks in equity financing. In general, there will be no payment by Bank 110 or delivery of shares by Issuer 100 at inception of the contract. The contract may be a traditional paper contract or electronic.

Issuer 100 may use the embodiment of the present invention to obtain financing at any time up to the maturity date of the contract. Benefits to Issuer include (1) the flexibility to raise an objectively-identifiable amount of cash at any time without unwinding the transaction, (2) the ability to defer dilution until cash is raised, and (3) the ability to participate in upside in the Issuer's stock.

In order to simplify exposition and by way of non-limiting example, assume the following with respect to the embodiment of FIG. 1. All such parameters may be modified in further embodiments of the present invention. Further, the terms according to the embodiment under discussion illustrative; terms in alternate embodiments may differ based on Issuer's objectives and market conditions.

Issuer's stock trades at $100 per share.

Issuer is interested in locking in equity capital today and preserving flexibility to draw the cash in the future. Assume 1 million underlying shares.

Issuer wants to retain upside in its shares.

Issuer does not want to be forced to unwind any option-based trades in order to draw cash from the contract.

As depicted in FIG. 1, Bank 110 may borrow the shares from a stock lender 120 at inception of the contract. As discussed further below in reference to FIG. 3, Bank 110 may sell the shares to investors 130 using registration to hedge the transaction.

Figure 2:
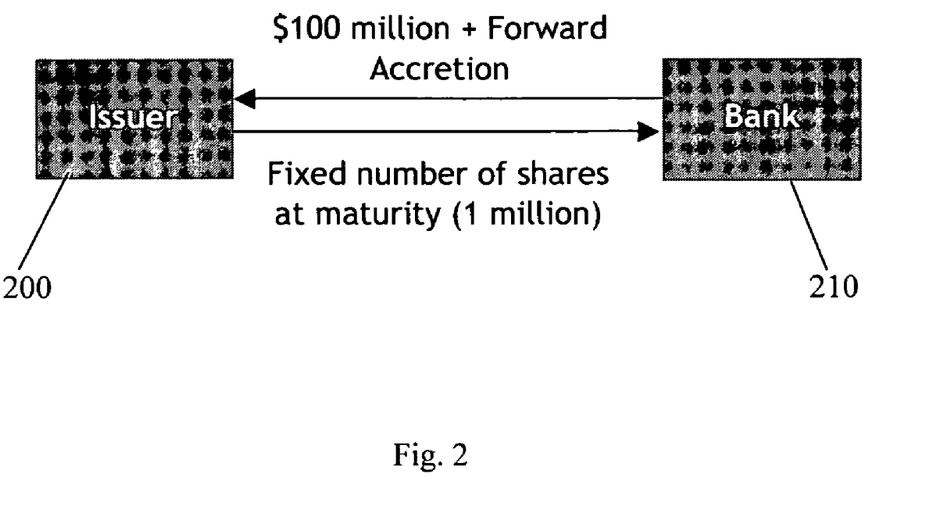
FIG. 2 is a schematic diagram illustrating an embodiment of the present invention at maturity.

FIG. 2 schematically represents the embodiment of FIG. 1 at maturity.

Regular Settlement (Physical Delivery At Maturity). The contract matures, by way of non-limiting example, at year 3, at which time Issuer 200 will deliver a fixed number of shares, again by way of non-limiting example, 1 million, to Bank 210. (Bank 210 may have a delta-1 short position prior to the time it receives the shares in physical settlement.) In exchange, Issuer 200 will receive:

$100 per share (the "Floor Price") if the Maturity Price is below $100;

the Maturity Price per share if the Maturity Price is between $100 and $120; or $120 per share (the "Ceiling Price") if the Maturity Price is above $120.

In the above, the "Maturity Price" may be the average closing price over a series of trading days preceding the maturity date (for example 30 trading days). By way of non-limiting example, the Maturity Price may be defined as the 10b-18 volume weighted average price during the 30 trading days up to the maturity date as specified in the contract.

Note that all of the figures and parameters described herein (e.g., Ceiling Price, Floor Price, Maturity Price, contract duration) are illustrative and meant to be non-limiting. Note also that the Ceiling and Floor Price levels may be set at lower levels based on an underwriting discount, which may be paid by the forward purchaser to the underwriter.

Cash Settlement Election At Maturity. If all or a portion of the shares remain unfunded at maturity, Issuer 200 may elect physical or cash settlement for the unfunded portion. For example, Issuer 200 may elect cash settlement at maturity if it does not have material non-public information (and assuming the trade has not been funded early). If cash settlement is elected, no shares will be delivered and the following payout formula applies, where "S" denotes the Maturity Price:

if S<$100, Bank 210 pays $100 minus S, per share, to Issuer 200;

if $100<S<$120, no payment is made by either party; or if S>$120, Issuer 200 pays S minus $120, per share, to Bank 210.

In the above, the Maturity Price "S" may be calculated as the average closing price over a series of trading days preceding the maturity date (for example 30 trading days). For example, the Maturity Price "S" for this portion of the contract may be defined as the 10b-18 volume weighted average price during the 30 trading days up to the maturity date as specified in the contract. Again, all of the figures and parameters described above are illustrative and meant to be non-limiting.

Bank may use computers to calculate the quantities involved in settling either or both of cash settlement and physical delivery. Issuer may use computers to perform identical calculations in order to confirm Bank's figures or otherwise utilize the transaction.

Early Funding. At any time during the term of the trade, Issuer 200 may choose to receive cash early in exchange for all or a portion of the underlying shares. The amount of cash received per underlying share will equal, by way of non-limiting example, the present value of the Floor Price, as calculated on the funding date by Bank 210 using, again by way of non-limiting example, a LIBOR curve. Issuer 200 may continue to participate in the upside of the shares until year three, via what is effectively a retained call spread with a low strike set at the Floor Price and a high call struck at the Ceiling Price. At maturity, Issuer 200 may settle the retained call spread in net cash, unless the contract has been fully funded (i.e., Issuer 200 has received cash in exchange for all contract shares), in which case Issuer 200 may elect to settle the call spread in net cash or net shares.

Continuing the discussion of early funding in relation to FIGS. 1 and 2, assume for purposes of illustration that after one year, the stock price is $110. Issuer 200 wishes to fund 40% of the shares. Assume the two-year discount factor at that time (based on LIBOR rates) is 0.92. Issuer will deliver 400,000 shares and receive $36,800,000 (40%×1 million×0.92×$100), or $92 per share, at year one. Thus, the price paid may be a present value of the Floor Price of the funded shares. Unless Issuer decides to fund against additional shares, Issuer's flows at year three will be as follows (the Maturity Price at year three is denoted "S"):

For the 400,000 share funded position (cash settlement):
If S<$100, $0 per share;
If $100<S<$120; S minus $100, per share; or
If S>$120, $20 per share.
For the 600,000 share un-funded position, the flows at maturity (year three) will remain as they were set at inception (assuming by way of non-limiting example physical settlement):
If S<$100, $100 per share;
If $100<S<$120; S per share; or
If S>$120, $120 per share.
All of the unfunded shares (600,000) will be delivered by Issuer 200 at maturity.

Bank may use computers to calculate the quantities involved in settling the contract at maturity when the early finding feature has been utilized. Issuer may use computers to perform identical calculations.

Hedging. Both Bank 210 and Issuer 200 preferably hedge their respective positions throughout the duration of the transaction.

Figure 3:
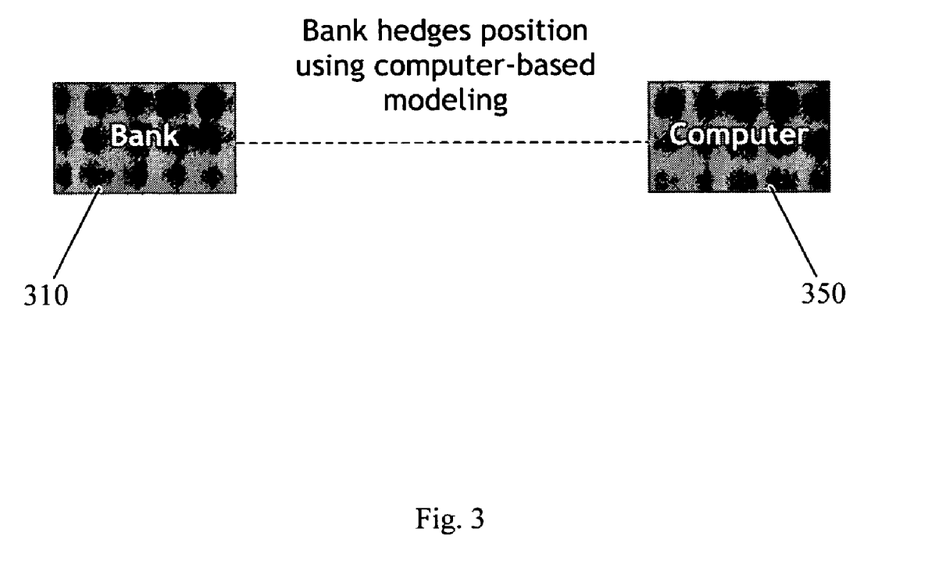
FIG. 3 is a schematic diagram illustrating an embodiment of the present invention during pendency.

FIG. 3 is a schematic diagram of an embodiment of the present invention during the contract's pendency. In a typical embodiment of the present invention, Bank 310 will dynamically hedge its position throughout the duration of the contract. Bank typically uses powerful computers 350 to model and predict prices and events. In particular, Bank's 310 computers 350 may implement pricing algorithms (by way of non-limiting example, Black-Scholes or related algorithms) in order to calculate the hedge.

Bank 310 may hedge the forward and call spread separately. That is, Bank 310 may maintain separate hedges for the embedded forward and call spread on an ongoing basis. In certain embodiments of the present invention, the transaction may be hedged by Bank 310 in a manner that is compliant with the SEC's guidance on the 2003 Microsoft transaction and the "No-Action, Interpretive and/or Exemptive Letter: Goldman, Sachs & Co." of Oct. 9, 2003.

Bank's Business Model. Bank may earn income in several ways consistent with embodiments of the present invention. First, Bank may charge fees for arranging the transaction. Such fees may be flat or a percentage of certain monies involved, such as the total amount of capital raised. Second, Bank may use a separate division or sister entity to underwrite the stock issuance. Third, Bank may benefit from its hedging positions.

Termination Events. In certain embodiments of the present invention, the contract may terminate early at fair market value based on specific corporate occurrences such as mergers and dividend-related events. Such events and their termination consequences may be specified within the contract itself.

Benefits And Advantages. Embodiments of the present invention have many advantages over traditional techniques. First, embodiments of the present invention may have a longer contract time periods compared with prior art techniques. For example, prior art techniques are generally limited to one-year contracts. Embodiments of the present invention, by contrast, may have contract periods of up to three years. Certain embodiments of the present invention may have contracts periods of over three years. Second, embodiments of the present invention effectively separate the timing of funding needs from the timing of the contract. That is, certain embodiments of the present invention allow for early funding. Such embodiments include contracts of various lengths; however, Issuers may draw cash at any time before expiration of the contract. This early drawdown feature allows Issuers to enter into contracts of a fixed time period without limiting their funding timing options. Issuers that wish to raise capital for an acquisition, for example, can enter into a contract according to an embodiment of the present invention and achieve excellent flexibility with respect to timing the acquisition deal. Third, embodiments of the present invention allow Issuers to obtain an upside, should the market allow, without the risk of a sizable downside. That is, Issuers benefit from any upside less than the Ceiling Price, while the Floor Price protects Issuers from adverse market turns. Fourth, embodiments of the present invention allow Issuers to raise capital in a manner that is similar to a straight stock sale, yet avoiding stock dilution. An Issuer may thus raise capital without fear of offending current investors by stock dilution. Fifth, embodiments of the present invention may be used by an Issuer to raise capital while simultaneously projecting a bullish market message regarding its stock. That Issuers may benefit from an expected upside creates a perception in the market of Issuer optimism. Sixth, the Issuer need not unwind the transaction or rely on a subjective market valuation in order to extract value prior to the contract's completion.

The exemplary embodiments discussed herein are not meant to be limiting. By way of non-limiting example, embodiments of the present invention include futures instead of, or in addition to, forwards. The financial instruments that are the subject of the forward are not limited to equity commodities issued by a party in the transaction. By way of non-limiting example, embodiments of the present invention include forward contracts for commodities such as stocks, pork bellies, etc.

Furthermore, embodiments of the present invention are not limited to Issuers who wish to raise capital for their public company. It is important to note that although the term "Issuer" is used throughout the present disclosure, it is not meant to be a term of limitation. That is, although certain embodiments of the present invention are discussed using the terms "Issuer" and "Bank," parties to a contract according to embodiments of the present invention need not literally be financial-instrument-issuing entities and investment banks, respectively. Thus, the term "Issuer" as used herein is not limited to entities that issue equity instruments. By way of non-limiting example, one such Issuer may be a housing developer who wishes to obtain funding for a future project that is timed to commence once a housing downturn begins. Such an Issuer may enter into a contract with a relatively long duration. At any time during the contract pendency, the Issuer may sense a housing market downturn and exercise his early funding option to raise capital for development.

The terminology used herein is for the purpose of describing particular embodiments only, and is not intended to limit the scope of the present invention. Unless defined otherwise, all technical and scientific terms used herein have the same meanings as commonly understood by one of ordinary skill in the art to which this invention belongs. As used throughout this disclosure, the singular forms "a," "an," and "the" include plural reference unless the context clearly dictates otherwise.

We claim:

1. A method comprising:
   contracting for sale of a first quantity of financial instruments on a maturity date in exchange for a price, at least one of the price and the first quantity reflecting a predetermined floor price and being at least partially dependant on a market price of the first quantity of financial instruments at a delivery date, the delivery being to an entity;
   delivering, in accordance with the step of contracting, a second quantity of the financial instruments at a time prior to the maturity date to the entity, wherein the second quantity is less than the first quantity;
   receiving value for the second quantity of financial instruments from the entity, the value reflecting a present value of the predetermined floor price calculated at a time prior to the delivery date, the step of receiving value being in accordance with the step of contracting;
   calculating a maturity settlement using a programmed computer, the step of calculating comprising accounting for the first quantity of financial instruments and accounting for the second quantity of financial instruments; and
   receiving compensation, the compensation comprising a difference between a ceiling price and the floor price for the second quantity of financial instruments if a market price of the second quantity of financial instruments at the delivery date is greater than the ceiling price, zero if the market price of the second quantity of financial instruments at the delivery date is less than the floor price, and a difference between the market price of the second quantity of financial instruments at the delivery date and the floor price for the second quantity of financial instruments if the market price of the second quantity of financial instruments at the delivery date lies between the ceiling price and the floor price for the second quantity of financial instruments.

2. The method of claim 1, wherein the price further comprises a predetermined ceiling price if a market price of the quantity of financial instruments at the maturity date is greater than the ceiling price and a market price of the quantity of financial instruments at the maturity date if the market price of the quantity of financial instruments at the maturity date lies between the ceiling price and the floor price.

3. The method of claim 2, wherein the ceiling price and the floor price are determined at the step of contracting.

4. The method of claim 1 further comprising issuing the financial instruments.

5. A system comprising:
   means for contracting with an entity to purchase a first quantity of financial instruments on a predetermined future date for a price, at least one of the price and the first quantity reflecting a predetermined floor price and being at least partially dependant on a market price of the first quantity of financial instruments at a delivery date;
   means for calculating a hedge for a position, the position defined at least partially by the contracting step;
   means for buying, in accordance with the contracting step, a second quantity of the financial instruments from the entity at a time prior to the predetermined future date for a value, the value reflecting a present value of the predetermined floor price calculated at a time prior to the delivery date, wherein the second quantity is less than the first quantity; and
   means for calculating a maturity settlement, the maturity settlement accounting for the first quantity of financial instruments and accounting for the second quantity of financial instruments.

* * * * *